United States Patent [19]

Nakagawa

[11] Patent Number: 4,603,253
[45] Date of Patent: Jul. 29, 1986

[54] RADIATION IMAGE CONVERTING PANEL AND AN APPARATUS FOR READING OUT A RADIATION IMAGE FROM THE SAME

[75] Inventor: Kouzou Nakagawa, Nishinasuno, Japan

[73] Assignee: Kabushiki Kaisha Toshiba, Kawasaki, Japan

[21] Appl. No.: 662,174

[22] Filed: Oct. 18, 1984

[30] Foreign Application Priority Data

Oct. 19, 1983 [JP] Japan ................................. 58-194039
Oct. 21, 1983 [JP] Japan ................................. 58-196044

[51] Int. Cl.$^4$ ............................................. G01T 1/105
[52] U.S. Cl. ................................ 250/327.2; 250/484.1
[58] Field of Search ......................... 250/327.2, 484.1

[56] References Cited

U.S. PATENT DOCUMENTS 3,859,527  1/1975  Luckey ............................. 250/327.2
4,394,581  7/1983  Takahashi et al. ............... 250/484.1

FOREIGN PATENT DOCUMENTS 100482   2/1984  European Pat. Off. ......... 250/483.1
55-15025  2/1980  Japan .
56-11398  2/1981  Japan .

Primary Examiner—Alfred E. Smith
Assistant Examiner—Constantine Hannaher
Attorney, Agent, or Firm—Finnegan, Henderson, Farabow, Garrett & Dunner

[57] ABSTRACT

A radiation image-converting panel has a stimulable phosphor layer formed on its base. On this stimulable phosphor layer there is formed a transparent protective layer, on which an auxiliary protective layer is pasted by a adhesive so that it can be peeled from the protective layer. In an apparatus for reading out a radiation image from the radiation image-converting panel, an adsorptive cup adsorbed to the base is moved in a sub-scanning direction and, at the same time, an adsorptive cup adsorbed to the auxiliary protective layer is rotated. Thus, the auxiliary protective layer can be peeled off from the protective layer. While the auxiliary protective layer is peeled, laser beams are caused to scan the stimulable phosphor layer through the protective layer. The phosphorescence emitted by this scanning is detected by a photodetector through a condensing portion.

11 Claims, 12 Drawing Figures

RADIATION IMAGE CONVERTING PANEL AND AN APPARATUS FOR READING OUT A RADIATION IMAGE FROM THE SAME

BACKGROUND OF THE INVENTION

The present invention relates to an image-converting panel (hereinafter abbreviated as IP) having a stimulable phosphor layer in which a radiation image can be stored and from which the radiation image can be read out, and an apparatus for reading out the radiation image from this IP.

In a conventional radiation photographing apparatus, for example, an X-ray photographing apparatus, X rays which have passed through a patient are irradiated onto a photographic film to obtain an X-ray image. However, the photographic film has an emulsion layer which consists of a silver salt sensitized material. In view of the present circumstances wherein silver resources are being drained, therefore, it is not preferable to use such a photographic film. An X-ray photographing technique which does not use the silver salt sensitized material has now been in demand.

Under the above-mentioned circumstances, an apparatus has been proposed which is intended to make a visible X-ray image without using silver (U.S. Pat. No. 3,859,527 and Japanese Patent Disclosure No. 15025/80). In this apparatus, an IP having a stimulable phosphor layer is used. That is, X-rays which have passed through a patient are absorbed into the stimulable phosphor layer of the IP. Subsequently, when the surface of IP is scanned by laser beams, an X-ray image previously stored in the stimulable phosphor layer is taken out in the form of a phosphorescence which then is detected and electrically processed. Thus, a visible X-ray image is obtained.

In this apparatus, since the phosphorescence which has been emitted from the stimulable phosphor layer is very weak, it is necessary to detect this phosphorescence with uniform efficiency over the entire storing region of IP. For this reason, it is necessary to efficiently impart to the stimulable phosphor layer the laser beams capable of releasing the X-ray image energy stored therein to cause it to absorb those laser beams, and further it is necessary to efficiently guide the phosphorescence thus emitted, to a photoelectric detector such as, for example, a photomultiplier tube.

By the way, as shown in FIG. 1, IP 2 is made into a thin rectangular panel, and, as shown in FIG. 2 by its enlarged sectional view, it is a laminate which consists of a base layer 4, phosphor layer 6 and a protective layer 8. The protective layer 8 consists of a transparent resin which is based on the use of a polyethyleneterephthalate based compound which is capable of efficiently transmitting the phosphorescence emitted from the stimulable phosphor 6 therethrough and also of lessening its diffusion during its transmission.

However, the polyethylene terephthalate based compound has a drawback in that it is low in resistance to friction and is also liable to be easily damaged by friction. For this reason, when the IP 2 is repeatedly used by being alternately set into an X-ray photographing apparatus and a radiation image reading-out device, scratches are caused to the protective layer 8. Because of these scratches, the sensitivity with which a radiation image can be read out from IP 2 is remarkably decreased. In FIG. 3, there is shown an X-ray photographing apparatus of a cassetteless type. A plurality of IPs is received in a magazine, from which one IP is taken out and is carried to a guide plate 12 by a pair of rollers 10. The direction in which IP 2 is moved is altered to a horizontal direction by the guide plate 12. Thus, the IP 2 is carried into a holder 16 in cooperation with a pair of rollers 14. The holder 16 is moved up to an X-ray photographing position in a state wherein IP is sandwiched between the holder members. The X rays which have passed through a patient are irradiated in the direction indicated by arrow 18. In this case, since the irradiation direction is the one which is indicated by arrow 18, the IP 2 is carried into the holder in such a manner that is protective layer 8 is located at the uppermost position of FIG. 3. For this reason, the protective layer 8 is unavoidably moved with pressure and friction against the guide plate 12 as well as against the holder 16. In this type of X-ray photographing apparatus, therefore, scratches are liable to be caused to the protective layer 8 of the IP.

In the case of photographic film, even when the emulsion layer thereof is scratched, the extent of scratch relative to the thickness thereof is negligible. The scratch in the emulsion layer has few undesirable effects when the photographic film is observed by a viewing cabinet for medical X-ray film.

In the case of IP, however, even when the scratches caused is small, the laser beams for releasing the energy stored in the stimulable phosphor layer are hindered from entering this layer. Moreover, the phosphorescence emitted from the stimulable phosphor is reflected by the scratches and is prevented from being carried into a photoelectric detector. For this reason, the sensitivity with which image information can be read out in a zone having such damage is remarkably decreased. As a result, the output image information in this zone of IP is omitted. From this there can arise the inconvenience of white or black lines appearing in a CRT display, hard copy, or the like.

SUMMARY OF THE INVENTION

In view of the above, the object of the present invention is to provide a radiation image converting panel which, even when repeatedly used, does not raise the problem that the sensitivity with which the radiation image is read out is decreased due to scratch caused to the panel, so that it is possible to obtain an image containing no omission of image information, and also to provide an apparatus for reading out the radiation image from the radiation image-converting panel.

According to the present invention, there is provided a radiation image-converting panel which stores therein a radiation image obtained by transmission of radiation through a patient and, upon irradiation of laser beams thereon, emits phosphorescence with a pattern corresponding to the radiation image. The radiation image converting panel has a base; a stimulable phosphor layer formed on the base, said stimulable phosphor layer being capable of absorbing the energy of radiation and releasing this energy as phosphorescence upon irradiation of laser beams thereon; a protective layer formed on the stimulable phosphor layer consisting of material capable of transmitting light therethrough; and an auxiliary protective layer disposed on the protective layer and pasted thereon in such a manner that it is peelable.

In the radiation image-converting panel having the above-mentioned construction, even when the panel is applied with a mechanical force by rollers or a guide plate during its transfer, only the auxiliary protective layer is damaged and the protective layer is not. Accordingly, if laser beams are irradiated onto the stimulable phosphor layer to read out the radiation image, and the auxiliary protective layer is turned up to expose the protective layer, it will be possible to obtain an image which is not at all affected by the damages caused to the panel and contains no omission of image information as a result of having read out the radiation image with high sensitivity.

Further, an apparatus for reading out a radiation image according to the present invention, comprises, a radiation image-converting panel which includes a storage layer capable of absorbing the energy of radiation and releasing this energy as phosphorescence when irradiated with laser beams. An auxiliary protective layer is disposed on the storage layer and is pasted thereon in such a manner that it is peelable therefrom. Peeling and pasting means peels the auxiliary protective layer from the storage layer to expose the latter, and also superposes and pastes the auxiliary protective layer onto the storage layer. A radiation-image readingout means reads out a radiation image from a radiation image-converting panel irradiated with radiation, said radiation-image reading-out means including a laser beam irradiating means for irradiating laser beams onto the storage layer from which the auxiliary protective layer has been peeled off by the peeling and pasting means. A detecting means detects the phosphorescence emitted from the storage layer upon the irradiation of laser beams, and converts the phosphorescence into an electrical signal.

According to the present invention, the radiation image-converting panel has an auxiliary protective layer. Accordingly, even when the radiation image-converting panel is alternately set into a radiation photographing apparatus and a radiation-image reading-out apparatus and is applied with mechanical forces from rollers and a guide plate during its transfer within each apparatus, only the auxiliary protective layer is scratched, not the protective layer. On the other hand, in the radiation-image reading-out apparatus of the present invention, laser beams are irradiated onto the storage layer by the laser beam irradiating means after the auxiliary protective layer was peeled off from the protective layer by the peeling and pasting means. For this reason, it is impossible that the arrival of laser beams at the storage layer would be made ineffective due to the scratches caused to the auxiliary protective layer. Further, it is impossible that the phosphorescence emitted from the storage layer be inconveniently reflected due to such scratches. According to the present invention, therefore, it is possible to obtain an image which contains no omission of image information as a result of reading out the radiation image with high sensitivity.

DETAILED DESCRIPTION OF THE PREFERRED EMBODIMENTS

Figure 1:
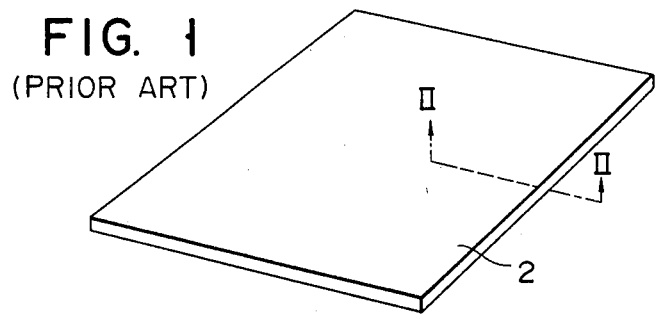
FIG. 1 is a perspective view of a prior art IP.
Figure 2:
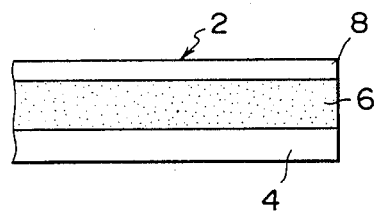
FIG. 2 is a sectional view of the IP shown in FIG. 1.
Figure 3:
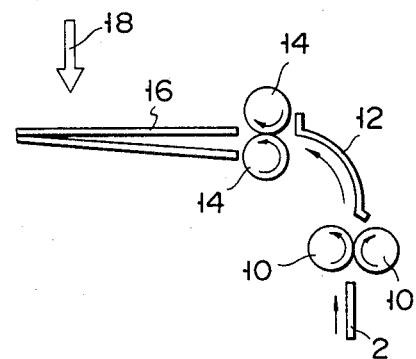
FIG. 3 shows a prior art X-ray photographing apparatus of cassetteless type.
Figure 4:
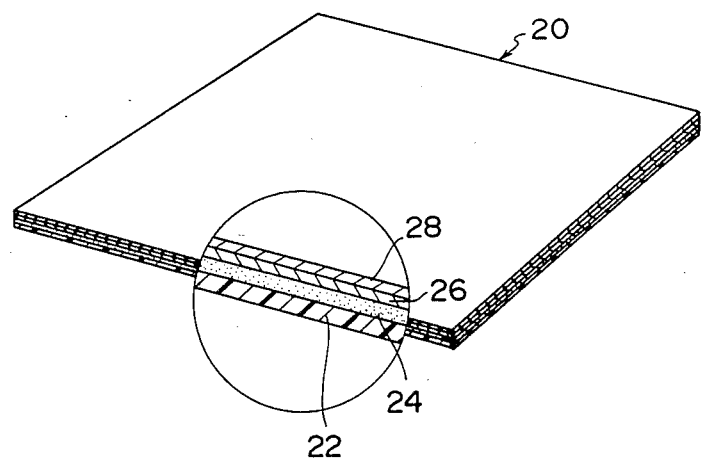
FIG. 4 is a perspective view of IP according to an embodiment of the present invention.
Figure 5:
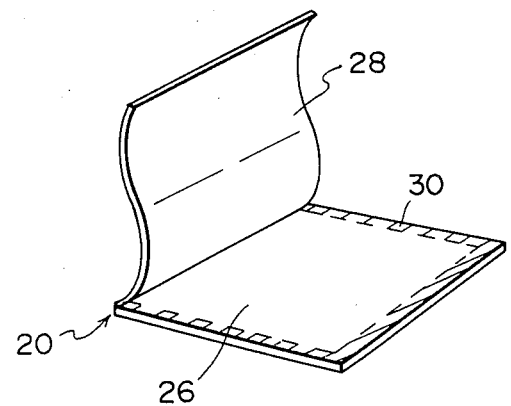
FIG. 5 is also a perspective view of the IP shown in FIG. 4.

FIG. 4 is a perspective view of IP 20 according to an embodiment of the present invention. The IP 20 has a base 22 which is formed of a polyester resin or the like and has a thickness of approximately 0.15 mm. The IP 20 has a stimulable phosphor layer 24 which is formed by coating onto the base 22 a dispersant prepared by filling into a binder a halogen crystal such as, for example, BaFX (X is halogen) to a high level. This stimulable phosphor layer 24 has a thickness of, for example, approximately 0.35 mm. On the stimulable phosphor layer 24 is superposed a protective layer 26 which consists of a transparent resin such as polyethylene terephthalate. Said protective layer 26 is bonded onto the phosphor layer 24 by an adhesive. The protective layer 26 has a thickness of, for example, approximately 0.1 mm. On each side of the three-layer laminate consisting of the base 22, phosphor layer 24 and protective layer 26, there is pasted a thin film (not shown), so that, the side surface of the phosphor layer 24 is prevented from the collapse. On the protective layer 26, an auxiliary protective layer 28 is superposed which consists of, for example, a transparent resin such as polyethlene terephthalate and the like. The auxiliary protective layer 28 has a thickness of, for example, approximately 0.1 to 0.2 mm. As shown in FIG. 5, it is fixed, at one side edge, to the protective layer 26, and is pasted or bonded thereto by an adhesive on its remaining three sides in such a manner that it is peelable therefrom. The adhesive is essentially comprised of, for example, 13% of synthetic rubber (acrylic rubber) and 87% of organic solvent (1,1,1-trichloroethane). The adhesive may continuously be coated on each side edge portion of the protective layer 26 or may be coated on the intermittent regions 30 disposed along each side edge portion thereof as shown in FIG. 5. Further, the adhesive may be either coated on only one side, or may be coated on all four sides so as to enable the auxiliary protective layer 28 to be removed from the protective layer 26. In any case, when the auxiliary protective layer 28 is turned up, the auxiliary protective layer 28 is exfoliated from the protective layer 26. When the auxiliary protective layer 28 is superposed upon the protective layer 26, it is pasted there to become an integral unit.

In the IP 20 having the above-mentioned construction, the X rays which have passed through a patient are irradiated onto the phosphor layer 24 through the auxiliary protective layer 28 and then through the protective layer 26, whereby X-ray radient energy is trapped in the phosphor layer 24. The IP 20 which has had the X-ray image stored and recorded therein is carried into a radiation-image reading-out apparatus. In this apparatus, the auxiliary protective layer 28 of the IP 20 is turned up, whereby laser beams are irradiated onto the phosphor layer 24 through the protective layer 26. As a result, the X-ray energy which has been trapped into the phosphor layer 24 is released, so that phosphorescence is emitted from the region irradiated with X rays corresponding to the intensity of the X rays. The laser beams are scanned on the phosphor layer 24 and the phosphorescence thus emitted is converted into electric signals which then are processed corresponding to the scanning position. The X-ray radiation image thus is made visible.

Figure 6:
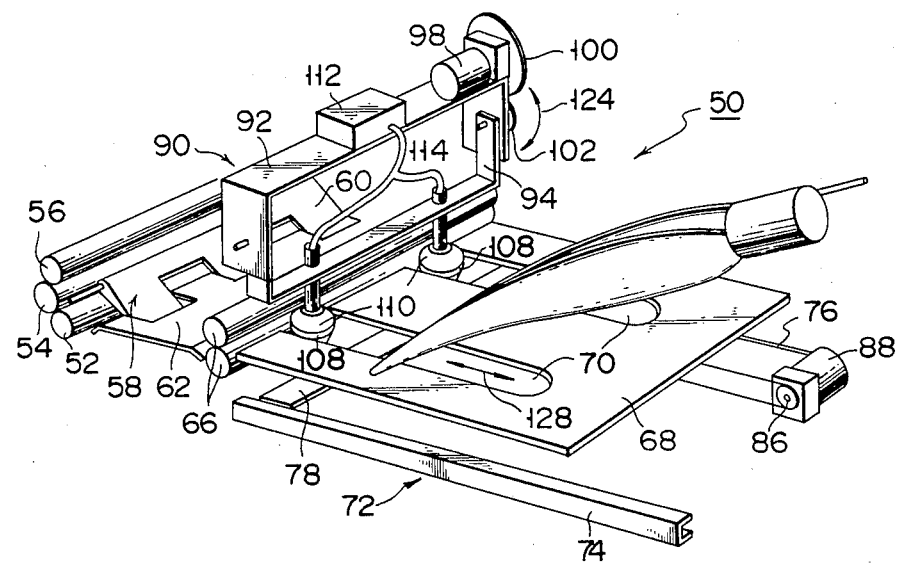
FIG. 6 is a perspective view of a radiation-image reading-out apparatus according to the embodiment of the present invention.
Figure 7:
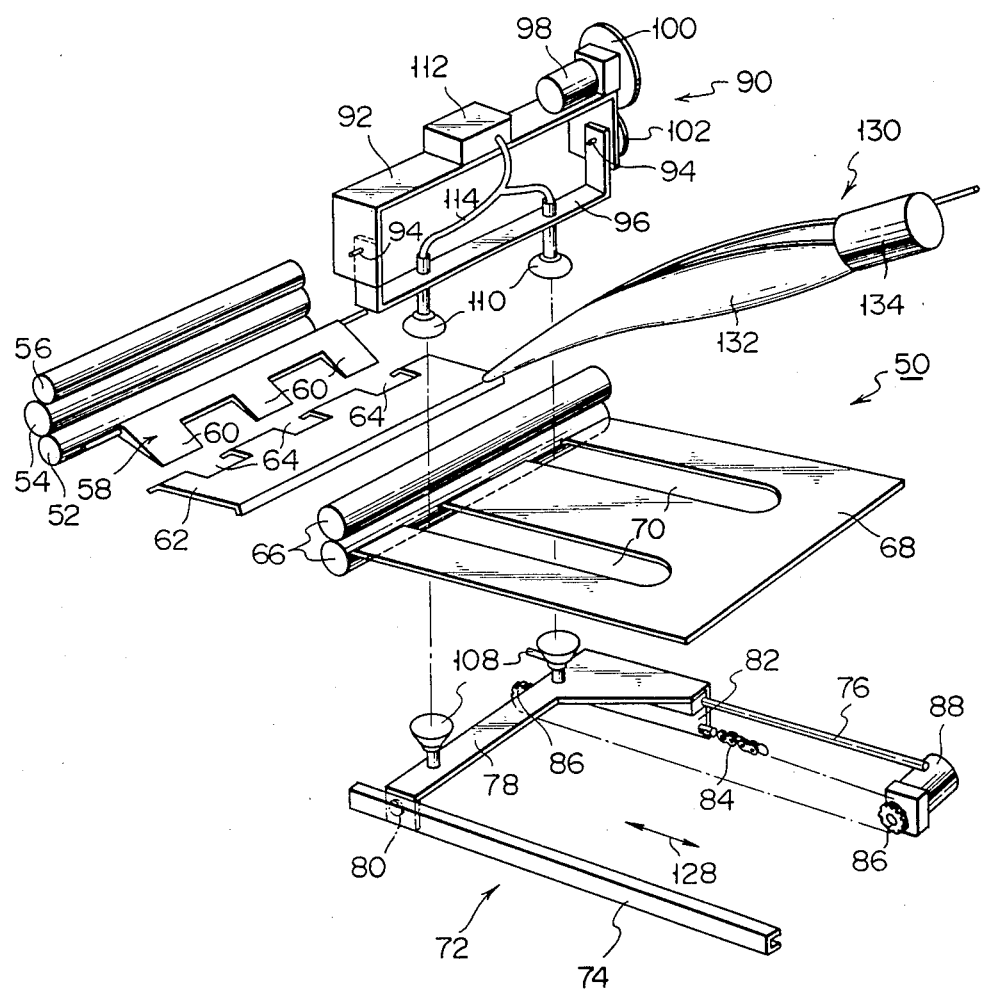
FIG. 7 is an exploded perspective view of the radiation-image reading-out apparatus shown in FIG. 6.

Next, the radiation-image reading-out apparatus which uses the IP 20 will be described. FIG. 6 is a perspective view of a radiation-image reading-out apparatus 50 according to the embodiment of the present invention, and FIG. 7 is an exploded perspective view thereof. Between a set of three branching rolls 52, 54 and 56 and a pair of guiding rolls 66, there is horizontally fixedly mounted a guide plate 62, which is formed with three notches on the side that has the branching rolls. Above that portion of the guide plate 62, a change-over guide 58 is rotatably mounted which has three blades 60 respectively insertable into the notches 64. Opposite the mounting position of the guide plate 62 with the guide rolls 66 in between, a zone is provided which is intended to be used to read out the image information of IP 20. A guide plate 68 is horizontally mounted in the vicinity of the guide rolls 66 which is included in this zone. The guide plate 68 has a pair of notches 70 which extends from the edge at the side of the guide rolls 66 in a direction perpendicular to the parallel axes thereof.

Above the guide plate 68 is disposed a peeling mechanism 90 for peeling the auxiliary protective layer 28 of the IP 20. Beneath the guide plate 68 is disposed a moving mechanism 72 for moving the IP 20. The moving mechanism 72 has a rail 74, which is mounted in such a manner as to extend in the longitudinal direction of the notches 70. A guide rod 76 is mounted in parallel with the guide rail 74 and, between this guide rail 74 and the guide rod 76, a movable member 78 is mounted in such a manner that it is supported thereon. On the movable member 78 there is rotatably mounted a wheel 80 which is engaged with the rail 74, as well as a slidable member 82 which is allowed to slide over the guide rod 86 by having this rod 86 inserted therethrough. Through the wheel 80 and slidable member 82, the movable member 78 can be reciprocatingly moved in the longitudinal directions of the rail 74 and the guide rod 76. To the slidable member 82 is fixed a chain 84 which is stretched over a pair of pulleys 86. One of these pulleys 86 is connected to a rotating shaft of a motor 88, the rotation of which causes the movable member 78 to be reciprocatingly moved through the pulleys 86 and chain 84. On the upper surface of the movable member 78, two adsorptive cups 108 are fixed in a state wherein their openings are pointed upwards.

The peeling or exfoliating mechanism 90 has a supporting member 92 which is located in the vicinity of, and above, that end of the guide plate 68 which resides on the side of the guide rolls 66. To the supporting member 92, a rotary member 96 is rotatably attached through shafts 94 in such a manner that its rotational axis is parallel with the axes of the guide rolls 66. Fixed to the rotary member 96 is a pair of adsorptive cups 110 in such a manner that their openings are pointed downwards. To the supporting member 92 is fixed a motor 98, whose rotating shaft is attached a gear 100. To the shaft 94 of the rotary member 96 is attached a gear 102 which is meshed with the gear 100. When the motor 98 is caused to rotate, the gear 102 is caused to rotate through the gear 100, and the rotary member 96 is caused to rotate. A suction device 112 is mounted on the supporting member 92. It has a suction pump (not shown) and a valve (not shown) and is connected to adsorptive cups 110 through a tube 114. When the suction pump of this suction device 112 operates to perform its suction operation, the adsorptive cups 110 attract the IP 20. When the pump has been made inoperative so that the interiors of the adsorptive cups 110 have been released to the air through the valve, these adsorptive cups 110 release the IP 20. A suction device (not shown) similar to the suction device 112 is provided with respect to the adsorptive cups 108 as well.

Figure 10:
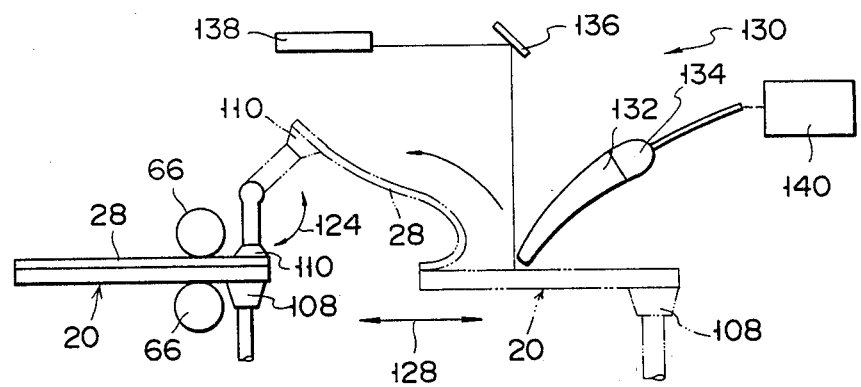
FIG. 10 is also a side view of the radiation-image reading-out apparatus of FIG. 6, which shows the manner in which the radiation image is read out from the radiation image converting panel.
Figure 11:
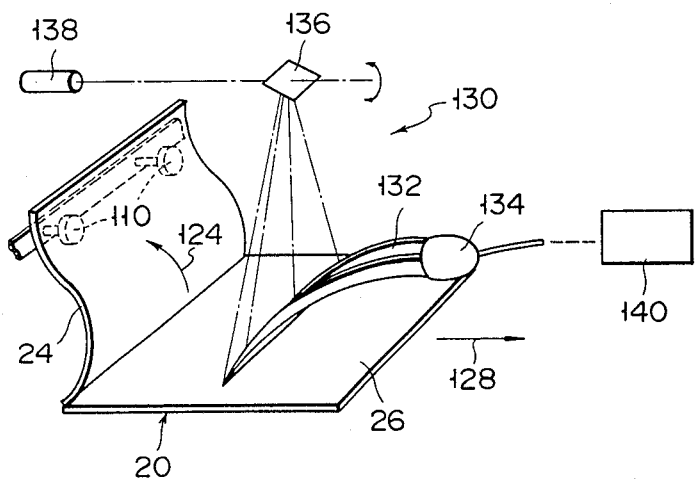
FIG. 11 is a perspective view of the apparatus of FIG. 6, which shows the manner in which radiation image is read out from the radiation image-converting panel; and, FIG. 12 is a perspective view of an IP according to another embodiment of the present invention.

Above the guide plate 68, there is disposed the radiation-image reading-out apparatus 130, which has a condensing portion 132 intended to collect the phosphorescence emitted from the IP 20, and a photodetector 134 for converting the phosphorescence to electric signals. The condensing portion 132 is shaped like a flat plate with its end portion residing on the side of the IP 20 (the guide plate 68), so that it extends in the direction which intersects the direction indicated by arrow 128 in which the adsorptive cups 108 are moved. The condensing portion 132 is curved, and its other end portion residing on the side of the photodetector 134 is rounded and connected to the same. The condensing portion 132 is formed of a material which is capable of transmitting light therethrough. Thus, the phosphorescence which has entered the condensing portion 132 at its end on the side of the IP 20 is guided by the portion 132 toward the photodetector 134. As shown in FIGS. 10 and 11, a rocking mirror 136 is installed right above that position of the guide plate 68 which faces the tip end of the flat-plate portion of the condensing portion 132. A laser tube 138 arranged to emit laser beams (500 to 800 nm) is disposed such that the direction of its irradiation is directed toward the rocking mirror 136. The laser beams which have been emitted from the laser tube 138 are reflected by the rocking mirror 136. Through the rocking movement of the rocking mirror 136, the laser beams are allowed to scan the IP 20 in the direction in which the flat-plate portion of the condensing portion 132 extends (the axial direction of the rolls 66), i.e., the direction in which the main scan is performed.

Figure 8:
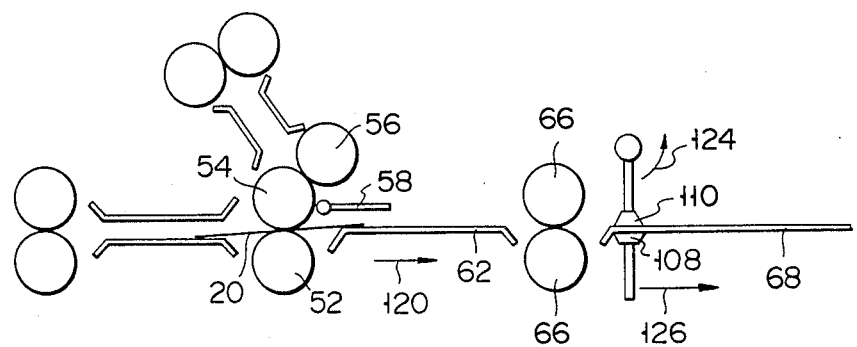
FIGS. 8 and 9 are side views of the radiation-image reading-out apparatus of FIG. 6, which shows the manner in which the apparatus operates.

The operation of the radiation-image reading-out apparatus 50 will now be described. First of all, in the X-ray photographing apparatus, X-rays which have passed through a patient are irradiated onto IP 20 to expose the same. The IP 20 is set into the radiation-image reading out apparatus 50 in a state wherein it is received within a cassette or magazine. Then, this IP 20 is taken out from the cassette or magazine, and is transferred to the change-over rolls 52, 54 by transfer means (not shown), as shown in FIG. 8. The change-over guide 58 is rotated upwards, so that its blades 60 are separated from the notches 64. The IP 20 which has been carried between the change-over rolls 52 and 54 is moved on the guide plate 62 in a direction indicated by the arrow 120, and then is carried between the guide rolls 66. Then, the IP 20 is guided onto the guide plate 68 by the guide rolls 66, and its forward end is clamped between the adsorptive cups 108, 110, Then, by the operation of the suction device 112, the adsorptive cups 108, 110 perform their suction operation, with the result that the base 22 of the IP 20 is adsorbed by the adsorptive cups 108 and the auxiliary protective layer 28 thereof is adsorbed by the adsorptive cups 110 (FIG. 10). Then, the rotation of the motor 88 causes the adsorptive cups 108 to be moved continuously or stepwise in the forward direction (the direction indicated by the arrow 128). At the same time, the rotation of the motor 98 causes the adsorptive cups 110 to be rotated upward (the direction indicated by the arrow 124). As a result, as shown in FIG. 10, while the IP 20 is moved forward on the guide plate 68, its auxiliary protective layer 28 is turned up with the result that its protective layer 26 is exposed. While the auxiliary protective layer 28 is turned up, laser beams are generated from the laser tube 138, and at the same time the rocking mirror 136 makes its rocking movement. The IP 20 is moved continuously or stepwise with the rotation of the motor 88 in the direction (indicated by the arrow 128) in which the subscan is performed. Thus, the laser beams are caused to scan the IP 20 in the main scanning direction intersecting this subscanning direction at right angles thereto, in accordance with the rocking movement of the rocking mirror 136. Through the scanning of the laser beams, the radiant energy of X-rays which was previously stored in the stimulable phosphor layer 24 is released so that phosphorescence is emitted and condensed by the condensing portion 132 and thus is detected by the photodetector 134, the output of which then is input into an image-processing device 140, in which the radiation image is processed on the basis of the irradiation position of the laser beams and the amount of the phosphorescence detected by the photodetector 134. Thus, the X-ray radiant image is displayed on a CRT or the like.

Figure 9:
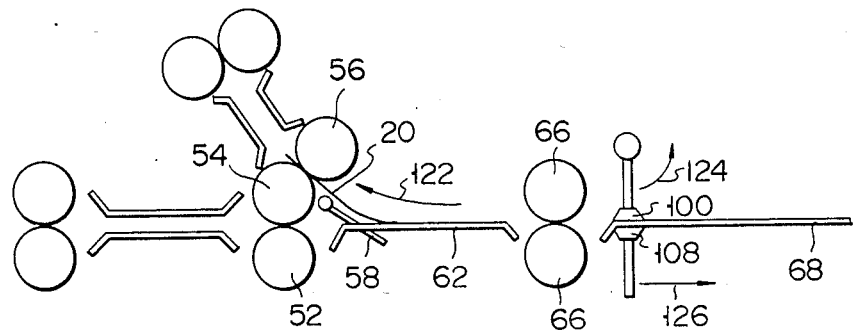

After the X-ray radiant image stored beforehand in the IP 20 has been read out in the above-mentioned way, the laser beams are ceased to scan. Subsequently, the rotation of the motor 88 causes the adsorptive cups 108 to move toward the guide rolls 66, while, on the other hand, the rotation of the motor 98 causes the adsorptive cups 110 to rotate downwards. Thus, the IP 20 is moved on the guide plate 68 toward the guide rolls 66, and its auxiliary protective layer 28 is superposed and pasted onto the protective layer 26. After the IP 20 is then carried between the guide rolls 66, the operation of the suction device 112 causes the respective interiors of the adsorptive cups 108 and 110 to be open to the atmosphere to restore atmospheric pressure. Thus, the adsorptive cups 108 and 110 release the IP 20, which subsequently is returned to the guide plate 62 by rotation of the guide rolls 66. As shown in FIG. 9, at this time, the change-over guide 58 is rotated to its previous position at which its blades 60 are fitted into the notches 64. The IP 20 which moves in the direction indicated by the arrow 122 is turned by the change-over guide 58 to a point between the change-over rolls 54 and 56. The IP 20 is thus carried between the change-over rolls 54 and 56 and is further carried to an eraser means (not shown) in accordance with their rotations. In the eraser means, the IP 20 has its entire surface exposed to light, whereby the energy stored in the stimulable phosphor layer 24 is completely released. Thus, the previous image information is erased as a whole. In the radiation-image reading-out apparatus 50 having the foregoing construction, during the conveyance of the IP 20 the auxiliary protective layer 28 is superposed on the protective layer 26. Accordingly, even when the IP 20 passes through various rolls and on various guide plates, only the auxiliary protective layer 28 is scratched, no scratch at all is caused to the protective layer 26. Accordingly, when the X-ray radiant image stored in the stimulable phosphor layer is read out, it is possible to reat it out without being affected by such damage because at that time the auxiliary protective layer 28 is turned up as shown in FIGS. 10 and 11. Namely, neither would it be possible that the irradiation of the laser beams onto the stimulable phosphor layer 24 would be hindered by such scratch, nor would it be possible that the phosphorescence emitted from the phosphor layer 24 be inconveniently reflected by such scratch in the IP 20.

Figure 12:
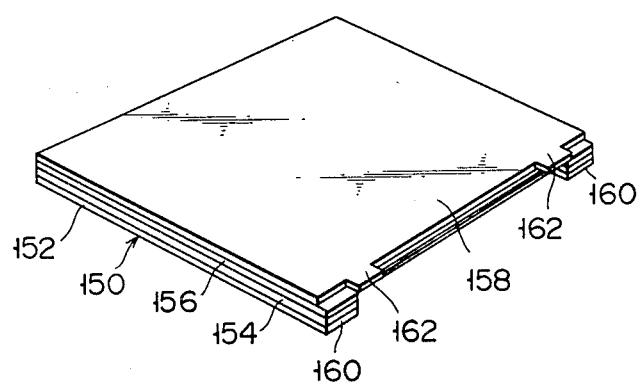

In FIG. 12, an IP 150 according to another embodiment of the present invention is shown. This IP 150 is used when the auxiliary protective layer is turned up without using any adsorptive cups. The IP 150 is also a laminate which is prepared by piling up a base layer 152, a stimulable phosphor layer 154, a protective layer 156 and an auxiliary protective layer 158 in the order mentioned, as in the case of the IP 50. The base 152, stimulable phosphor layer 154 and protective layer 156, which are superposed upon each other and are fixedly held in place, each have projections 160 at their furthest edges, respectively. On the other hand, the auxiliary protective layer 158 has a pair of projections 162 at a position which is in the vicinity of the projections 160 and which is inwardly displaced therefrom. In the radiation-image reading-out apparatus using this IP 150, the projections 162 of the auxiliary protective layer 158 are clamped by grips, whereby the auxiliary protective layer 158 is turned up by the upward movements of these grips.

What is claimed is:

1. A radiation image-converting panel for storing therein a radiation image obtained by transmission of radiation through a patient and, upon irradiation of laser beams thereon, converting it into phosphorescence, comprising:

a base;

a stimulable phosphor layer formed on the base, said stimulable phosphor layer being capable of absorbing the energy of radiation and releasing said energy as phosphorescence upon irradiation of laser beams thereon;

a protective layer formed on the stimulable phosphor layer and consisting of material capable of transmitting light therethrough; and an auxiliary protective layer disposed on the protective layer and pasted thereon in such a manner that it is peelable.

2. A radiation image-converting panel according to claim 1, wherein the radiation irradiated onto the stimulable phosphor layer is X-ray radiation which emits phosphorescence when irradiated with laser beams.

3. An apparatus for reading out a radiation image comprising:

a radiation image-converting panel which includes a storage layer capable of absorbing the energy of radiation and releasing said energy as phosphorescence when irradiated with laser beams and an auxiliary protective layer disposed on the storage layer and pasted thereon in such a manner that it is peelable;

a peeling and pasting means for peeling the auxiliary protective layer from the storage layer to expose the latter and also for superposing the auxiliary protective layer onto the storage layer to paste the former onto the latter; and a radiation-image reading-out means for reading out a radiation image from the radiation image-converting panel irradiated with radiation, said radiation-image reading-out means including a laser beam irradiating means for irradiating laser beams onto the storage layer from which the auxiliary protective layer has been peeled off by the peeling and pasting means, and a detecting means for detecting the phosphorescence emitted from the storage layer upon irradiation of laser beams and converting the phosphorescence into an electric signal.

4. An apparatus according to claim 3, wherein said peeling and pasting means has a peeling adsorptive cup which is capable of adsorbing the auxiliary protective layer and a rotating mechanism for rotating the peeling adsorptive cup, whereby the auxiliary protective layer is peeled by rotation of the peeling adsorptive cup having the auxiliary protective layer adsorbed thereto.

5. An apparatus according to claim 4, wherein said peeling and pasting means has a moving adsorptive cup which is capable of adsorbing the storage layer, and a moving mechanism which is used to move the moving adsorptive cup in parallel with the surface of the radiation-image converting panel, whereby the auxiliary protective layer is peeled when the peeling adsorptive cup having the auxiliary protective layer adsorbed thereto is rotated simultaneously with the movement of the moving adsorptive cup having the storage layer adsorbed thereto.

6. An apparatus according to claim 5, wherein said laser beam irradiating means has a laser beam source which generates laser beams, and a scanning means for causing said laser beams to scan the panel in the main scanning direction; and said moving mechanism causes the radiation image converting panel to move in a subscanning direction which intersects the main scanning direction at right angles thereto.

7. An apparatus according to claim 6, wherein said rotating mechanism has a rotatable rotary member which is mounted with the peeling adsorptive cup, and a motor for rotating the rotary member.

8. An apparatus according to claim 7, wherein said moving mechanism has a movable member mounted with the moving adsorptive cup, a guiding means for guiding the movable member so that it can be moved in the subscanning direction, and a motor for moving the movable member.

9. An apparatus according to claim 8, wherein said detecting means has a photodetector for converting light into electric signals, and a condensing portion for collecting the phosphorescence emitted from the storage layer and guiding it to the photodetector.

10. An apparatus according to claim 9, wherein the light-incident end of the condensing portion is extended in the main scanning direction so as to collect the phosphorescence emitted from that portion of the storage layer located on the main scanning line.

11. An apparatus according to claim 10, wherein the storage layer of the radiation image-converting panel includes a base, a stimulable phosphor layer formed on the base, said stimulable phosphor layer being capable of absorbing the energy of radiation and releasing said energy as phosphorescence when irradiate with laser beams, and a protective layer formed on the stimulable phosphor layer and consisting of material capable of transmitting light therethrough, said auxiliary protective layer being disposed on said protective layer.

* * * * *